UNITED STATES PATENT OFFICE.

CARL R. KRUEGER, OF SCHENECTADY, NEW YORK, ASSIGNOR TO GENERAL ELECTRIC COMPANY, A CORPORATION OF NEW YORK.

ELECTRODE.

1,061,758. Specification of Letters Patent. Patented May 13, 1913.

No Drawing. Application filed October 16, 1911. Serial No. 654,878.

*To all whom it may concern:*

Be it known that I, CARL R. KRUEGER, a citizen of the United States, residing at Schenectady, county of Schenectady, State of New York, have invented certain new and useful Improvements in Electrodes, of which the following is a specification.

My invention has reference to an electrode of the flaming or luminous type, and particularly to such an electrode in which titaniferous material and especially metallic titanium or titanium carbid or a mixture of the same is present as one of the principal light giving constituents. Materials of the above character are among the most efficient light producing materials known, but an electrode containing such materials forms a layer of non-conducting slag upon its arcing surface, which causes the arc to jump around irregularly. My theory of the reason for this is that the thickness of the layer is uneven and the arc shifts from one point to another, seeking the path of least resistance. Whatever may be the correct theory, however, I find that such a non-conducting layer is formed in an electrode in which metallic titanium or titanium carbid or a mixture of the two is present in substantial quantities and that such a layer seriously interferes with the burning of the arc. The titanium arc is long and thin and naturally unsteady and when this unsteadiness is increased by the layer of slag, the arc collapses frequently, causing correspondingly frequent and objectionable feeding operations. Moreover, such a non-conducting layer of slag on the arcing face of the electrode often prevents the arc from being properly struck when the electrodes are separated for this purpose and frequently the electrodes are separated and again brought together in rapid succession, producing a disagreeable "pounding" of the electrodes. I have found that the formation of such a non-conducting layer in an electrode in which titaniferous material is present can be prevented by the addition thereto of a small percentage of cupreous material and the feeding operation of the lamp is thereby greatly improved. Such an electrode burns with a black conducting tip and is entirely free from the non-conducting layer and the evils accompanying the same. I have used several cupreous materials such as metallic copper, copper oxid, copper chlorid and copper fluorid, and these all well serve the purposes of my invention. It will be seen, therefore, that my invention covers broadly any cupreous material,—the beneficial effects apparently being due to the presence of the copper. I have obtained excellent results by taking titanium carbid, which I procured in the market and which contained a small percentage, say six or seven per cent., of carbon, and mixing therewith two per cent. of finely divided metallic copper. I have also obtained excellent results by taking titanium carbid which was made in the resistance furnace and which contained a comparatively large percentage of carbon, for example, twenty-five or thirty per cent., and mixing therewith the same amount of metallic copper. Now the theoretical amount of carbon present in pure titanium carbid is approximately twenty per cent., so that in the first case the mixture was composed of titanium carbid and a large percentage of metallic titanium, while in the second case titanium carbid was mixed with a substantial percentage of carbon. It will be seen therefore that my invention is useful in electrodes in which the amount of titanium carbid varies widely and that it is equally applicable to an electrode composed of pure titanium carbid and to an electrode in which there is but a small percentage of titanium carbid present, the remainder being formed either of metallic titanium or carbon. I have found too that the percentage of copper can vary considerably from the amount mentioned above and still come within my invention. Furthermore, when copper compounds, instead of the metal copper, are used, I have found that it is desirable to use a somewhat larger percentage, usually about three per cent. I have found that if more than a small percentage of copper or a copper compound is present, the arc becomes non-luminous. If but a small percentage of cupreous material is used, however, the luminosity of the arc is not interfered with. These titanium carbid electrodes are usually made by filling the carbid mixture into an iron tube and compacting it within the same.

My invention is also applicable to what is known in the art as a flaming electrode, that is, an electrode in which free carbon is added to the electrode in substantial quantities but in which enough titanium or titanium carbid or a mixture of these is present to produce a slag. When free carbon, however, is present in substantial quantities, there is usually not the same necessity for the addition of cupreous materials, as the presence of the carbon itself when used in substantial quantities has a tendency to steady the arc.

I have found that the cupreous material can advantageously be introduced into the electrode by adding it to the titanium carbid or metallic titanium or a mixture of the two and subsequently forming the electrode, or the cupreous material may be mixed with the rutile and carbon from which the titanium carbid is formed.

What I claim as new and desire to secure by Letters Patent of the United States, is,—

1. An arc light electrode containing titaniferous material and a small percentage of a cupreous material.

2. An arc light electrode composed of titaniferous material which produces a slag in burning and a small percentage of a cupreous material.

3. An arc light electrode containing titanium carbid and a small percentage of cupreous material.

4. An arc light electrode containing titaniferous material and an admixture of a small percentage of metallic copper.

5. An arc light electrode containing titanium carbid and a small percentage of metallic copper.

6. An arc light electrode composed mainly of titaniferous material and an admixture of between one and three per cent. of a cupreous material.

7. An arc light electrode composed mainly of titaniferous material and an admixture of between one and three per cent. of finely divided metallic copper.

In witness whereof, I have hereunto set my hand this 13th day of October, 1911.

CARL R. KRUEGER.

Witnesses:
 BENJAMIN B. HULL,
 HELEN ORFORD.